United States Patent [19]
Okada

[11] Patent Number: 6,122,243
[45] Date of Patent: Sep. 19, 2000

[54] OPTICAL INFORMATION RECORDING APPARATUS, OPTICAL RECORDING MEDIUM, AND METHOD OR JUDGING TRACKING POLARITY OF OPTICAL RECORDING MEDIUM

[75] Inventor: Mitsuya Okada, Tokyo, Japan

[73] Assignee: NEC Corporation, Tokyo, Japan

[21] Appl. No.: 09/030,805

[22] Filed: Feb. 26, 1998

[30] Foreign Application Priority Data

Feb. 27, 1997 [JP] Japan .................................. 9-044041

[51] Int. Cl.[7] ........................................................ G11B 7/00
[52] U.S. Cl. ................................................. 369/124.12; 369/47
[58] Field of Search .............................. 369/275.1, 275.4, 369/283, 288, 275.3, 44.26, 124.11, 124.12, 44.41, 44.29, 44.35, 49, 47

[56] References Cited

U.S. PATENT DOCUMENTS

| 5,508,995 | 4/1996 | Moriya et al. | 369/275.4 |
| 5,637,394 | 6/1997 | Nakajima et al. | 369/283 |
| 5,650,992 | 7/1997 | Ohkubo | 369/275.1 |
| 5,872,767 | 2/1999 | Nagai et al. | 369/44.26 |

FOREIGN PATENT DOCUMENTS

| 1-286122 | 11/1989 | Japan . |
| 6-176404 | 6/1994 | Japan . |
| 7-29186 | 1/1995 | Japan . |
| 7-50014 | 2/1995 | Japan . |
| 10-11764 | 1/1998 | Japan . |

OTHER PUBLICATIONS

K. Kayanuma et al., "High track density magneto–optical recording using a crosstalk canceler", pp. 35–39, The International Society for Optical Engineering, vol. 1316 Optical Data Storage, Mar. 5–7, 1990.

*Primary Examiner*—Thang V. Tran
*Attorney, Agent, or Firm*—Young & Thompson

[57] ABSTRACT

A tracking groove comprising a land area and a groove area is previously provided on a substrate of an optical disk, and a prepit is previously provided on a boundary line between the land area and the groove area of the tracking groove. When information is recorded on both the land and groove areas, a half-split photodetector split into two parts by a splitting line perpendicular to the radial direction of the optical disk is used as a photoreceiver for receiving light reflected from the optical disk. The photoreceivers are switched so that light reflected from the prepit is reproduced as a signal in any one of the two photodetectors. This enables reproduction signals derived from light reflected from the prepit to be reproduced at a good S/N ratio, thus realizing an optical information recording apparatus which bas a simple construction and enables information to be recorded on both the land and groove areas.

2 Claims, 5 Drawing Sheets

FIG.3A
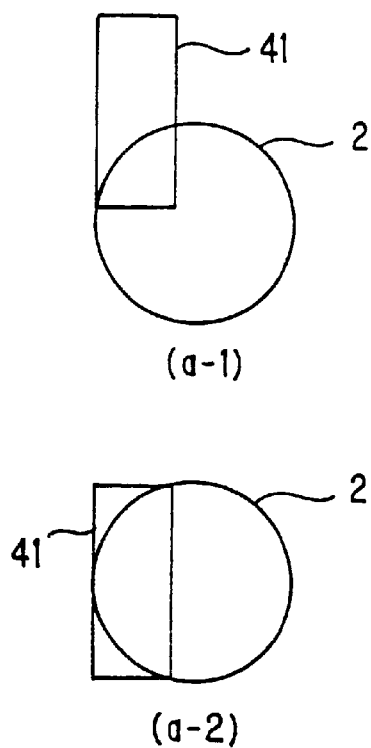
(a-1)
(a-2)
(a-3)
FIG.3B
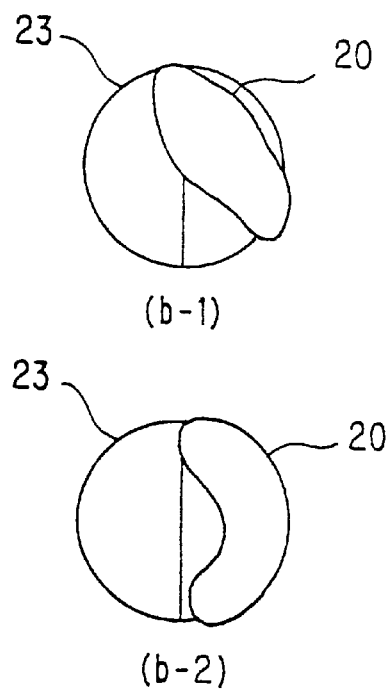
(b-1)
(b-2)
(b-3)
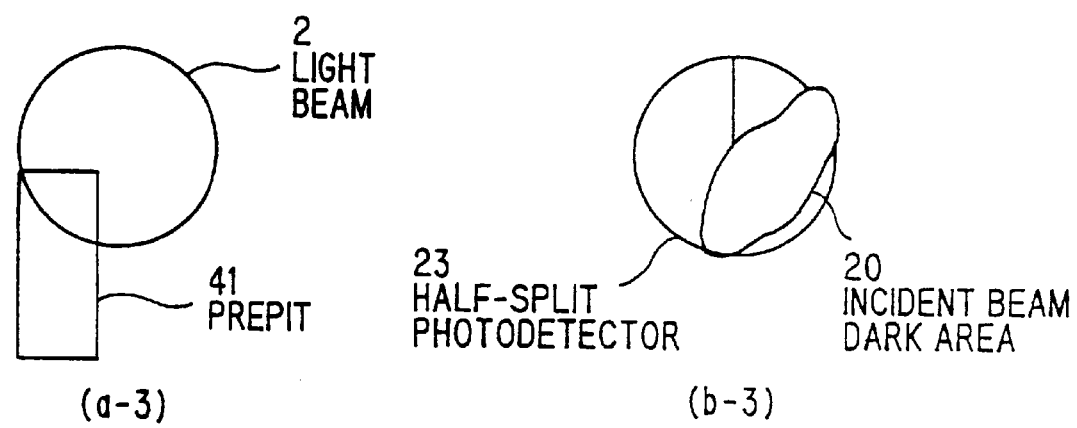

FIG. 4A
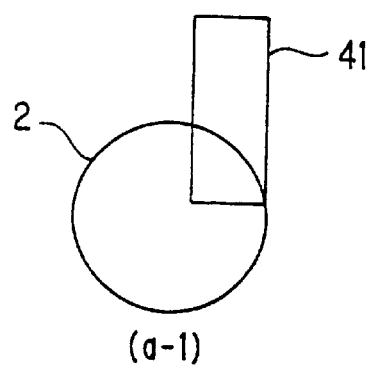
(a-1)
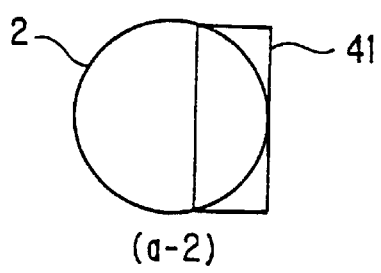
(a-2)
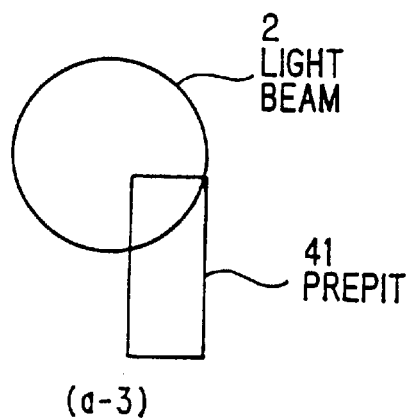
(a-3)
FIG. 4B
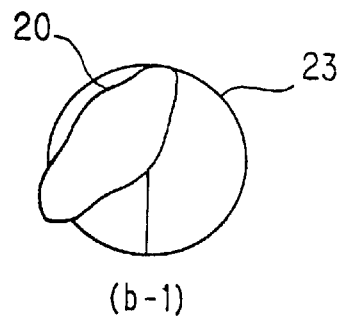
(b-1)
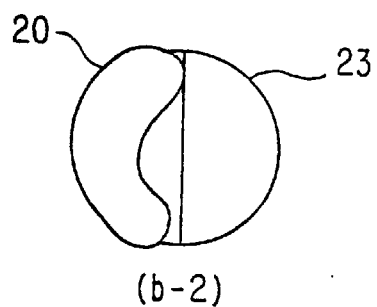
(b-2)
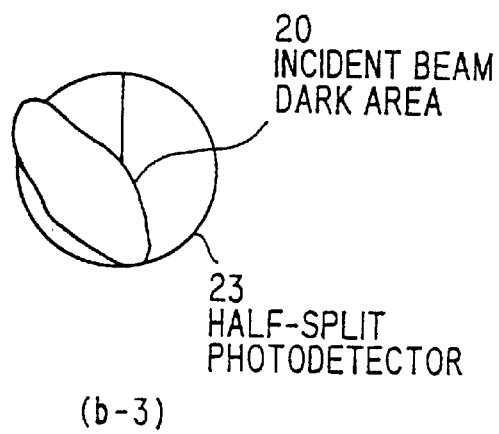
(b-3)

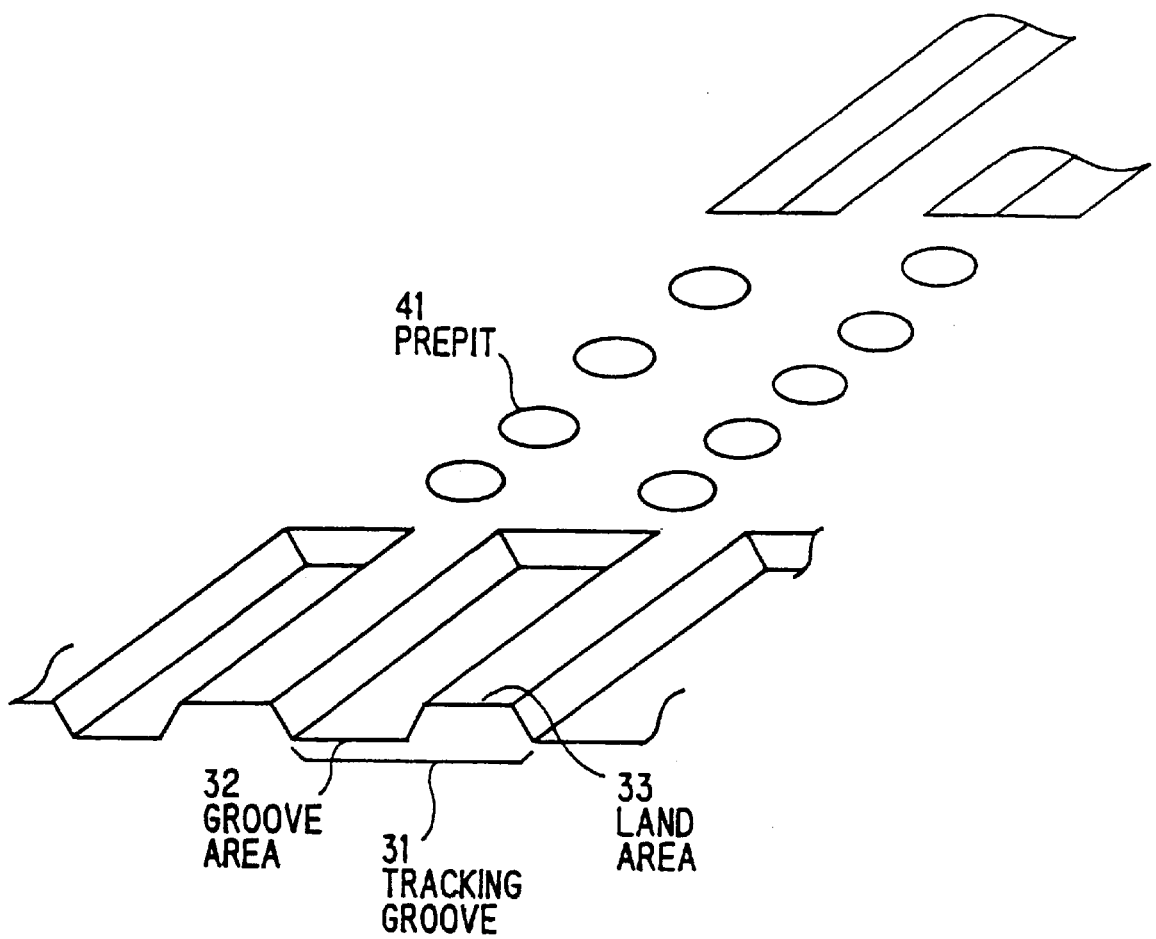

OPTICAL INFORMATION RECORDING APPARATUS, OPTICAL RECORDING MEDIUM, AND METHOD OR JUDGING TRACKING POLARITY OF OPTICAL RECORDING MEDIUM

FIELD OF THE INVENTION

The present invention relates to an optical information recording apparatus wherein a laser beam is applied to an optical information recording medium to record, reproduce, and erase information, an optical recording medium for the information recording apparatus, and a method for judging the tracking polarity of the optical recording medium.

BACKGROUND OF THE INVENTION

Optical information recording apparatuses for recording information on an optical recording medium using a laser beam enables high-capacity recording and high-speed access in a non-contact manner and hence have been put to practical use as a high-capacity storage for information processors. Optical recording media (optical disks) for use in the optical information recording apparatus are classified into read-only type capable of performing reproduction of previously recorded information only, as well known as compact disk media and laser disk, write-once type which, although information can be additionally recorded by users, does not permit rewriting of information, and rewritable type which permits a record to be repeatedly rewritten by users. The write-once type optical disks and rewritable optical disks have been used as external memories for computers and as files for storing documents and images.

The optical information recording apparatus in current use detects a reproduction signal from a laser beam which has been modulated by and reflected from the optical disk. For example, in the read-only type optical disk, a reproduction signal is recorded by utilizing a change in quantity of light reflected from an irregular pit provided on the optical disk. The write-once optical disk utilizes a change in quantity of reflected light due to a very small pit formed by laser beam irradiation or due to a phase-change created by laser beam irradiation. In an magneto-optical recording medium, one type of rewritable optical disks, the magneto-optic effect exerted by a recording layer is utilized, and the magnetized state of the recording layer is read out as a change in plane of polarization to recover a reproduction signal. In the phase-change type recording medium, another rewritable optical disk, as with the write-once type optical disk, a reproduction signal is taken out by utilizing a change in quantity of reflected light due to phase-change.

In the conventional optical information recording apparatus, the so-called "CSS servo system" is adopted wherein an optical disk having a spiral tracking groove (groove) provided at a pitch of 1.2 to 1.6 μm on a transparent resin or glass substrate is used and a focused laser beam tracks along the spiral groove to record information. In this system, one track is divided into several sectors, and a preformatted, irregular pit indicating the sector address is recorded in the head of each sector. In the recording of information, the so-called "groove recording system" or "land recording system" is adopted wherein information is recorded on any one of the groove area and the land area in each track groove. The preformatted, irregular pit also is provided on any one of the groove area and the land area in each track groove.

In order to improve the recording density of the optical information recording apparatus, a land/groove recording system is promising wherein information is recorded on both the land and groove areas in the track groove rather than on any one of the land and groove areas. Usefulness of this system has already been reported by K. Kayanuma et al. (SPIE Proceedings, Vol. 1316, p. 35 (1990)). However, it is very difficult to narrow the track pitch and, at the same time, to form a good preformatted, irregular pit on both the land and groove areas.

In the optical pitch having a narrow track pitch, the preformatted, irregular pit has hitherto been formed, for example, as described in Japanese Patent Laid-Open No. 286122/1989 wherein positions of adjacent preformatted, irregular pits are alternately shifted. This method, however, is limited to the case where the preformatted, irregular pit is formed on only any one of the groove and land areas in the track groove.

Further, the formation of a preformatted, irregular pit on a boundary line between the land area and the groove area has been proposed in Japanese Patent Laid-Open No. 176404/1994. However, no means for good reproduction of the signal from the preformatted, irregular pit has been disclosed in this publication. Specifically, in this system, address information for specifying the sector address regarding information recording is formed as a preformatted, irregular pit on a boundary line between the land area and the groove area, and the address information is used both in the land and groove areas in pair. Since, however, there is no means for efficiently reproducing the address information without error, it is difficult to realize an optical information recording apparatus having address information reproduction means in a recording system suitable for high-density recording, that is, a land/groove recording system.

As described above, in the conventional land/groove recording system, there is no means for efficiently reproducing the preformatted irregular pit indicating each sector address without error. Therefore, it is difficult to realize an optical information recording apparatus having address information reproduction means in a recording system suitable for high-density recording, that is, a land/groove recording system.

SUMMARY OF THE INVENTION

Accordingly, an object of the present invention is to solve the drawbacks of the conventional optical information recording apparatus of land/groove recording system and to provide an optical information recording apparatus which has simple construction and enables high-capacity recording, an optical recording medium for use in the optical information recording apparatus, and a method for judging the tracking polarity of the optical recording medium.

According to the first feature of the invention, an optical information recording apparatus comprises: an optical recording medium for optically recording, reproducing, and erasing information; a drive system for driving the rotational motion of the optical recording medium; and an optical head for applying a laser beam to the optical recording medium to record, reproduce, and erase information, the optical head comprising a laser beam source for emitting a laser beam; a focusing lens for focusing the laser beam on the optical recording medium; and a half-split photodetector for detecting the laser beam reflected from the optical recording medium, the half-split photodetector having been split into two parts with a splitting line parallel to a tracking groove defined below, the recording medium comprising: a substrate; and, previously provided on the substrate, a tracking groove comprising a land area and a groove area and an irregular prepit provided on a boundary line between the land area and the groove area in the tracking groove, information being recordable on both the land and groove areas, the two photodetectors in the half-split photodetector being switchable so that, when the laser beam reflected from the prepit in the optical recording medium is input into the half-split photodetector, signal reproduction is performed in any one of the two photodetectors. Preferably, the tracking groove in the optical recording medium has the groove area and the land area provided in that order from the inner side of the optical recording medium and, when information recorded on the groove area is reproduced, a signal from the prepit is reproduced using a signal output from the photodetector in the half-split photodetector that detects the laser beam reflected from the land area, in the laser beams reflected from the prepit of the optical recording medium. When information recorded on the land area is reproduced, a signal from the prepit is reproduced using a signal output from the photodetector in the half-split photodetector that detects the laser beam reflected from the groove area, in the laser beams reflected from the prepit of the optical recording medium. Alternatively, the tracking groove in the optical recording medium has the land area and the groove area provided in that order from the inner side of the optical recording medium and, when information recorded on the land area is reproduced, a signal from the prepit is reproduced using a signal output from the photodetector in the half-split photodetector that detects the laser beam reflected from the groove area, in the laser beams reflected from the prepit of the optical recording medium. When information recorded on the groove area is reproduced, a signal from the prepit is reproduced using a signal output from the photodetector in the half-split photodetector that detects the laser beam reflected from the land area, in the laser beams reflected from the prepit of the optical recording medium.

According to the second feature of the invention, an optical recording medium comprises: a substrate; and, previously provided on the substrate, a tracking groove comprising a land area and a groove area and an irregular prepit provided on a boundary line between the land area and the groove area in the tracking groove, information being recordable on both the land and groove areas, wherein the groove area and the land area are provided in that order from the inner side of the optical recording medium. Alternatively, the land area and the groove area are provided in that order from the inner side of the optical recording medium. Preferably, a first dielectric layer, a magneto-optical recording layer, and a second dielectric layer are provided in that order on the substrate, or a first dielectric layer, an magneto-optical layer, a second dielectric layer, and a metallic reflective layer are provided in that order on the substrate, or a first dielectric layer, a phase-change type recording layer, and a second dielectric layer are provided in that order on the substrate, or a first dielectric layer, a phase-change type recording layer, a second dielectric layer, and a reflective layer are provided in that order on the substrate, or a first dielectric layer, a phase-change type recording layer, a second dielectric layer, a reflective layer, and a third dielectric layer are provided in that order on the substrate.

According to the third feature of the present invention, a method for judging the tracking polarity of an optical recording medium in an optical information recording apparatus comprises: an optical recording medium for optically recording, reproducing, and erasing information; a drive system for driving the rotational motion of the optical recording medium; and an optical head for applying a laser beam to the optical recording medium to record, reproduce, and erase information, the optical head comprising a laser beam source for emitting a laser beam, a focusing lens for focusing the laser beam on the optical recording medium, and a half-split photodetector for detecting the laser beam reflected from the optical recording medium, the half-split photodetector having been split into two parts with a splitting line parallel to a tracking groove defined below, the recording medium comprising a substrate and, previously provided on the substrate, a tracking groove comprising a land area and a groove area and an irregular prepit provided on a boundary line between the land area and the groove area in the tracking groove, information being recordable on both the land and groove areas, the two photodetectors in the half-split photodetector being switchable so that, when the laser beam reflected from the prepit in the optical recording medium is input into the half-split photodetector, signal reproduction is performed in any one of the two photodetectors, wherein the output levels of the two photodetectors, into which the laser beam reflected from the prepit has been input, are compared with each other to judge whether the area being tracked by the optical head is the land area or the groove area.

BRIEF DESCRIPTION OF THE DRAWINGS

The present invention will be explained in more details in conjunction with the appended drawings, wherein:

FIGS. 3A and 3B are explanatory views showing one principal of the reproduction of a preformatted, irregular pit of an optical disk according to the preferred embodiment shown in FIG. 1;

FIGS. 4A and 4B are explanatory views showing another principal of the reproduction of a preformatted, irregular pit of an optical disk according to the preferred embodiment shown in FIG. 1;

FIG. 5 is a perspective view showing one preferred embodiment of a preformatted, irregular pit in the optical disk according to the present invention.

DESCRIPTION OF THE PREFERRED EMBODIMENTS

Preferred embodiments of the present invention will be described with reference to the accompanying drawings.

Figure 1:
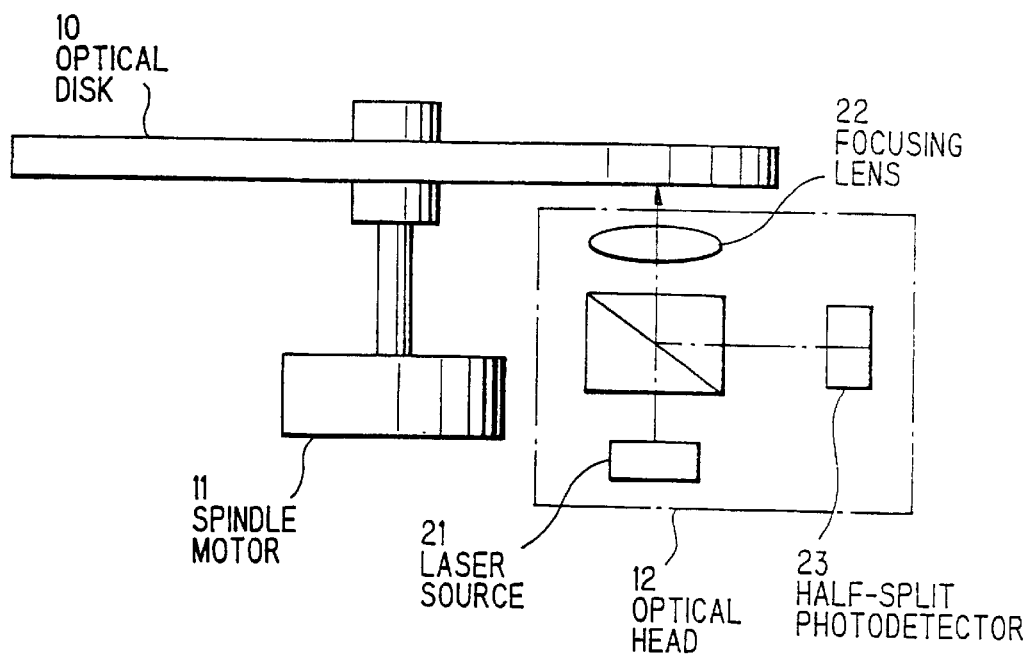
FIG. 1 is a block diagram showing one preferred embodiment of the optical information recording apparatus according to the present invention.
Figure 2:
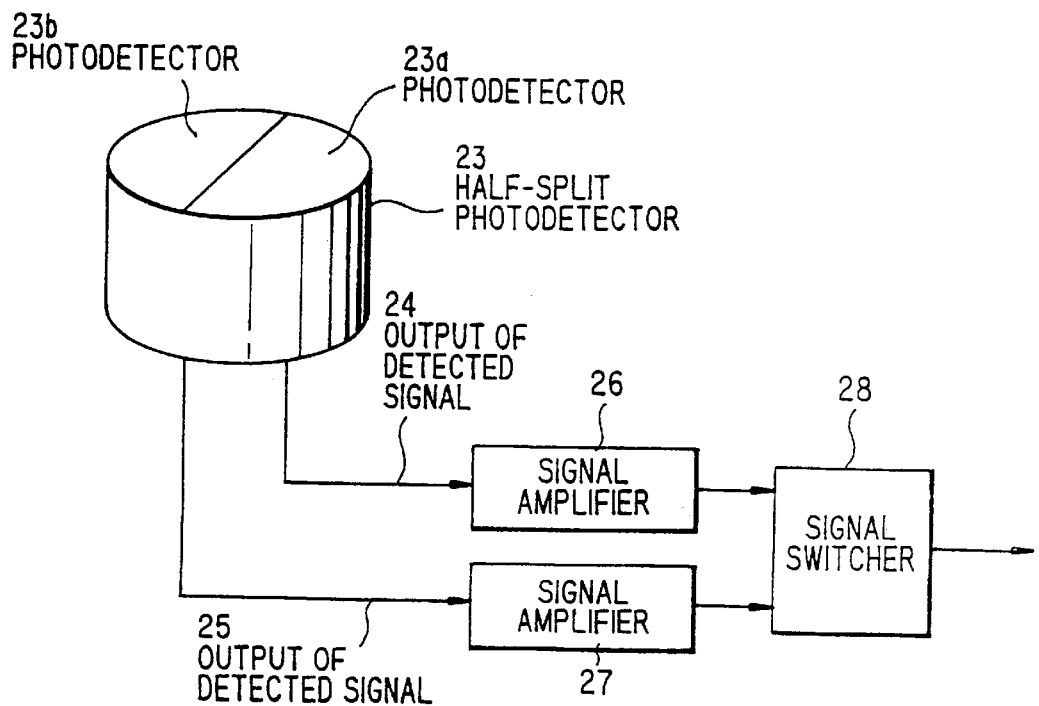
FIG. 2 is a perspective view of a half-split photodetector in the preferred embodiment shown in FIG. 1.

The optical information recording apparatus shown in FIG. 1 comprises an optical recording medium (an optical disk) 10 for optically recording, reproducing, and erasing information, a spindle motor 11 as a drive system for driving the rotational motion of the optical disk 10, and an optical head 12 for applying a laser beam to the optical disk 10 to record, reproduce, and erase information.

The optical head 12 has a laser beam source 21 for emitting a laser beam a focusing lens 22 for focusing the laser beam, emitted from the laser beam source 21, onto the optical disk 10, and a half-split photodetector 23 for detecting the laser beam reflected from the optical disk 10.

The half-split photodetector 23 for detecting the laser beam reflected from the optical disk 10 has been spilt, by a splitting line parallel to the tracking groove 31 (see FIG. 5) of the optical disk 10, into two photodetectors 23a and 23b, and detected signal outputs 24 and 25 from the photodetectors 23a and 23b are respectively input into and amplified by signal amplifiers 26 and 27. A signal switcher 28 performs switching in such a manner that any one of the signal from the signal amplifier 26 and the signal from the signal amplifier 27 is output.

Figure 6A:
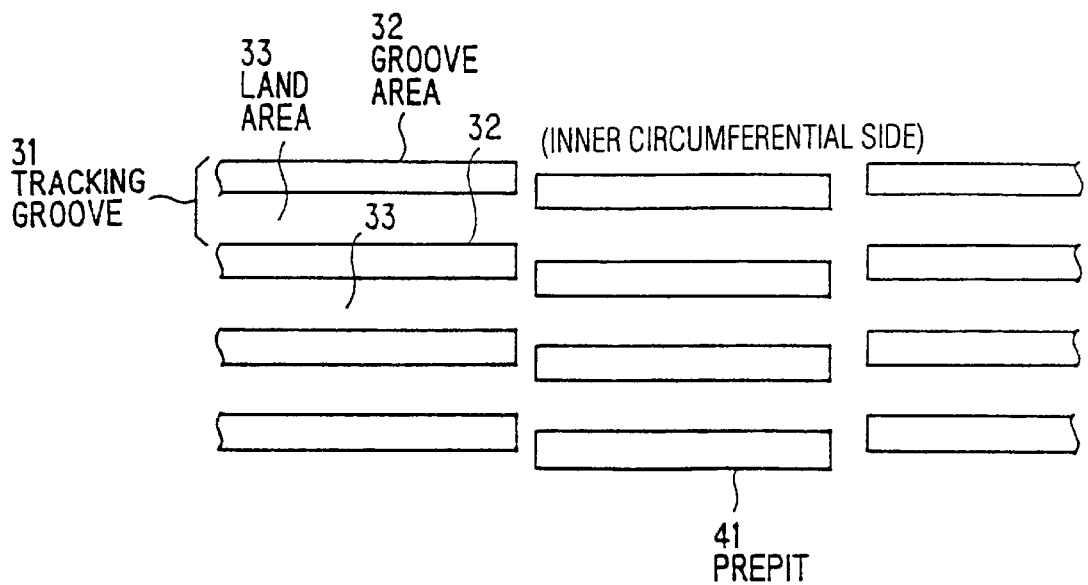
FIGS. 6A and 6B are plan views showing the layout of the preformatted, irregular pit in the embodiment shown in FIG. 5.
Figure 6B:
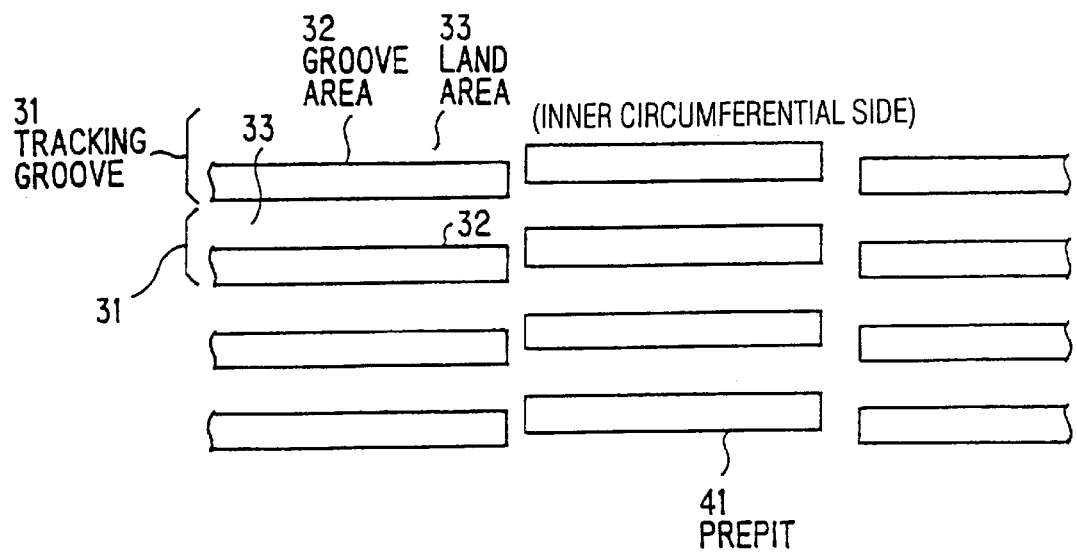

As shown in FIG. 5, in the optical disk 10, a spiral tracking groove 31 comprising a land area 33 and a groove area 32, is previously provided on the substrate. Information is recorded on both the land area 33 and the groove area 32. One track of the tracking groove 31 is divided into several sectors, and, in the head of each sector, a preformatted, irregular pit (prepit) 41 for indicating the address of the sector is formed on a boundary line between the land area 33 and the groove area 32. The prepit 41 may be provided by two layouts, a layout as shown in FIG. 6A and a layout as shown in FIG. 6B. In the layout shown in FIG. 6A, the groove area 32 and the land area 33 of the tracking groove 31 are provided in that order from the inner side of the optical disk 10, and the prepit 41 is provided on a boundary line between the groove area 32 and the land area 33. On the other hand, in the layout shown in FIG. 6B, the land area 33 and the groove area 32 of the tracking groove 31 are provided in that order from the inner side of the optical disk 10, and the prepit 41 is provided on a boundary line between the land area 33 and the groove area 32.

In the prepits 41 provided by the above two layouts, when the signal of light reflected from the prepit 41 of the optical disk 10 is reproduced, the signal detection method is changed according to the layout of the prepit 41. Specifically, in the case of an optical disk 10 having a construction as shown in FIG. 6A, the output of the signal amplifier 26 or the output of the signal amplifier 27 is switched by means of the signal switcher 28 in such a manner that, when information recorded on the groove area 32 of the optical disk 10 is reproduced, the signal of the prepit 41 is reproduced by the signal output from the photodetector which detects light (component) reflected on the outer side of the optical disk 10 in the light reflected from the optical disk 10. When information recorded on the land area 33 of the optical disk 10 is reproduced, the signal of the prepit 41 is reproduced by the signal output from the photodetector which detects the component on the inner side of the optical disk 10 in the light reflected from the optical disk 10.

Likewise, in the case of an optical disk 10 having a construction as shown in FIG. 6B, the output of the signal amplifier 26 or the output of the signal amplifier 27 is switched by means of the signal switcher 28 in such a manner that, when information recorded on the groove area 32 of the optical disk 10 is reproduced, the signal of the prepit 41 is reproduced by the signal output from the photodetector which detects the component reflected on the inner side of the optical disk 10 in the light reflected from the optical disk 10, while, when information recorded on the land area 33 of the optical disk 10 is reproduced, the signal of the prepit 41 is reproduced by the signal output from the photodetector which detects the component on the outer side of the optical disk 10 in the light reflected from the optical disk 10.

An magneto-optical recording layer, a phase-change recording layer, or a write-once many-read recording layer for recording information thereon or a reflective layer for read-only purposes is provided on the substrate.

The magneto-optical layer is mainly formed of a rare earth transition metal alloy, and examples of materials usable herein include terbium-iron (TbFe), terbium-iron-cobalt (TbFeCo), gadolinium-iron-cobalt (GdTbFeCo), dysprosium-terbium-iron-cobalt (DyTbFeCo), gadolinium-dysprosium-terbium-iron-cobalt (GdDyTbFeCo), dysprosium-cobalt (DyCo), and terbium-cobalt (TbCo). Materials for a dielectric layer used in magneto-optical recording media include silicon nitride (SiN), silicon monoxide (SiO), aluminum nitride (AlN), and tantalum oxide (TaO), and materials for the metallic reflective layer usable herein include aluminum (Al) and aluminum-titanium (AlTi)

Major materials for the phase-change recording layer usable herein include chalcogenide materials, such as germanium-antimony-tellurium (GeSbTe), germanium-tellurium (GeTe), and indium-antimony-tellurium (InSbTe). A dielectric layer used in phase-change type recording media is formed of a material composed mainly of zinc sulfide (ZnS), zinc sulfide-silicon dioxide (ZnS—SiO$_2$), silicon nitride (SiN), silicon monoxide (SiO), aluminum nitride (AlN), tantalum oxide (TaO) or the like. Major materials for the reflective layer usable herein include aluminum (Al), aluminum-titanium (AlTi), silicon (Si), and germanium (Ge).

The function of the optical information recording apparatus having the above construction will be described with reference to FIGS. 3A, 3B, 4A and 4B.

As described above, in the optical information recording apparatus of the present invention, the signal of light reflected from the prepit 41 is detected by means of the half-split photodetector 23 split into two parts, that is, photodetectors 23a and 23b, by a splitting line parallel to the tracking groove 31 of the optical disk 10 (that is, at a right angle to the radial direction of the optical disk 10). When information recorded on the land area 33 of the optical disk 10 is reproduced, one of the photodetectors is used, and when information recorded on the groove area 32 is reproduced, the other photodetector is used. In both the reproduction of information recorded on the land area 33 and the reproduction of information recorded on the groove area 32, a focused laser beam (light beam) 2 scans a position deviated from the center line of the prepit 41 provided on a boundary line between the land area 33 and the groove area 32 of the optical disk 10. Therefore, the reflected light is asymmetrical with respect to the detection face of the half-split photodetector 23. FIG. 3B shows the quantity of light in the half-split photodetector 23 in the case where the light beam 2 scans a position deviated in a direction to the right of the center line of the prepit 41. When the light beam 2 scans the prepit 41 in the order of (a-1), (a-2), and (a-3) in FIG. 3A, an incident beam dark portion 20 is created as shown in (b-1), (b-2), and (b-3) in FIG. 3B. In this case, the photodetector on the right side exhibits a larger change in quantity of light.

FIG. 4B shows the quantity of light in the half-split photodetector 23 in the case where the light beam 2 scans a position deviated in a direction to the left of the center line of the prepit 41. When the light beam 2 scans the prepit 41 in the order of (a-1), (a-2), and (a-3) in FIG. 4A, an incident beam dark portion 20 is created on the photodetection face of the half-split photodetector 23 as shown in (b-1), (b-2), and (b-3) in FIG. 4B. In this case, the photodetector on the left side exhibits a larger change in quantity of light. Therefore, when a photodetector different from the photodetector for detecting the signal of light reflected from the prepit 41 in the reproduction of the groove area 32 (reproduction of groove) is used in the reproduction of the land area 33 (reproduction of land) by switching using a signal switcher, or vice versa, address information can be obtained at a good S/N ratio. Further, from comparison of detection levels of the two photodetectors, it is also possible to judge whether the reproduction is the reproduction of land or the reproduction of groove.

The following examples further illustrate the present invention but are not intended to limit it.

EXAMPLE 1

In order to confirm the function and effect of the above preferred embodiments, an experiment was carried out using the following optical recording apparatus. Specifically, the optical recording apparatus had an optical disk having a diameter of 120 mm mounted on a spindle motor 11 and an optical head 12 comprising a laser source 21, which emits a semiconductor laser having a wavelength of 680 nm and a maximum output of 30 mW, a focusing lens 22 having a numerical aperture (NA) of 0.60, and a half-split photodetector 23 with a photodetecting section having a diameter of 2.0 mm.

In the optical disk, a tracking groove having a pitch of 1.2 $\mu$m (groove area and land area: each 0.60 $\mu$m in width) is provided on one side of a polycarbonate resin substrate having a thickness of 0.60 mm and a diameter of 120 mm, and the groove area is provided on the inner side with the land area being provided on the outer side A prepit is previously recorded on a boundary line between the groove area and the land area.

A 65 nm-thick first dielectric layer of silicon nitride ($Si_3N_4$), a 50 nm-thick magneto-optical recording layer of gadolinum-iron-cobalt (GdFeCo), and a 100 nm-thick second dielectric layer of silicon nitride ($Si_3N_4$) are continuously provided on the substrate by RF sputtering.

The above optical disk was mounted on the optical information recording apparatus to reproduce signals from the prepit. In this case, the output of a signal amplifier 26 or a signal amplifier 27 was switched by means of a signal switcher 28 so that, when the signal from the groove area of the tracking groove is reproduced a signal output from the outer photodetector in the half-split photodetector 23 is detected, while, when the signal from the land area of the tracking groove is reproduced, a signal output from the inner photodetector in the half-split photodetector 23 is detected. As a result, good reproduced signals could be obtained from the prepit.

EXAMPLE 2

In this example, the same optical disk as used in Example 1 was provided, except that a 65 nm-thick first dielectric layer of $Si_3N_4$, a 20 nm-thick magneto-optical recording layer of gadolinum-iron-cobalt (GdFeCo), and a 60 nm-thick second dielectric layer of silicon nitride ($Si_3N_4$) are continuously provided on the substrate by RF sputtering and, further, a 100 nm-thick metallic reflective layer of aluminum-titanium (AlTi) is continuously provided thereon by RF sputtering. This optical disk was mounted on the same optical information recording apparatus as in Example 1 to reproduce signals from the prepit. In this case, switching of reproduction signals from the prepit was performed in the same manner as in Example 1. As a result, good reproduced signals could be obtained from the prepit.

EXAMPLE 3

In this example, the following optical disk was used. A tracking groove having a pitch of 1.2 $\mu$m (groove area and land area: each 0.60 $\mu$m in width) is provided on one side of the same substrate as used in Example 1, that is, a polycarbonate resin substrate having a thickness of 0.60 mm and a diameter of 120 mm, and the land area is provided on the inner side with the groove area being provided on the outer side. A prepit is previously recorded on a boundary line between the land area and the groove area. A 150 nm-thick first dielectric layer of zinc sulfide-silicon dioxide (ZnS—$SiO_2$), a 35 nm-thick phase-change type recording layer of germanium-antimony-tellurium (GeSbTe), and a 120 nm-thick second dielectric layer of zinc sulfide-silicon dioxide (ZnS—$SiO_2$) are continuously provided on the substrate by RF sputtering.

The above optical disk was mounted on the same optical information recording apparatus as in Example 1 to reproduce signals from the prepit. In this case, the output of a signal amplifier 26 or a signal amplifier 27 was switched by means of a signal switcher 28 so that, when the signal from the land area of the tracking groove is reproduced, a signal output from the outer photodetector in the half-split photodetector 23 is detected, while, when the signal from the groove area of the tracking groove is reproduced, a signal output from the inner photodetector in the half-split photodetector 23 is detected. As a result, good reproduced signals could be obtained from the prepit.

EXAMPLE 4

In this example, the same optical disk as used in Example 3 was provided, except that a 230 nm-thick first dielectric layer of zinc sulfide-silicon dioxide (ZnS—$SiO_2$), a 20 nm-thick phase-change type recording layer of germanium-antimony-tellurium (GeSbTe), and a 27 nm-thick second dielectric layer of zinc sulfide-silicon dioxide (ZnS—$SiO_2$) are continuously provided on the substrate by RF sputtering and, further, a 150 nm-thick reflective layer of aluminum (Al) is continuously provided thereon by RF sputtering. This optical disk was mounted on the same optical information recording apparatus as in Example 1 to reproduce signals from the prepit. In this case, switching of reproduction signals from the prepit was performed in the same manner as in Example 3. As a result, good reproduced signals could be obtained from the prepit.

EXAMPLE 5

In this example, the same optical disk as used in Example 4 was provided, except that a 150 nm-thick first dielectric layer of zinc sulfide-silicon dioxide (ZnS—$SiO_2$), a 35 nm-thick phase-change type recording layer of germanium-antimony-tellurium (GeSbTe), a 20 nm-thick second dielectric layer of zinc sulfide-silicon dioxide (ZnS—$SiO_2$), and a 120 nm-thick reflective layer of aluminum-titanium (Al—Ti) are continuously provided on the substrate by RP sputtering and, further, a 60 nm-thick third dielectric layer of zinc sulfide-silicon dioxide (ZnS—$SiO_2$) is continuously provided thereon by RF sputtering. This optical disk was mounted on the same optical information recording apparatus as in Example 1 to reproduce signals from the prepit. In this case, switching of reproduction signals from the prepit was performed in the same manner as in Example 3. As a result, good reproduced signals could be obtained from the prepit.

EXAMPLE 6

In this example, the same optical disk as used in Example 4 was provided, except that a 230 nm-thick first dielectric layer of zinc sulfide-silicon dioxide ($ZnS$—$SiO_2$), a 12 nm-thick phase-change type recording layer of germanium-antimony-tellurium (GeSbTe), a 18 nm-thick second dielectric layer of zinc sulfide-silicon dioxide ($ZnS$—$SiO_2$), a 60 nm-thick reflective layer of silicon (Si), and a 120 nm-thick third dielectric layer of zinc sulfide-silicon dioxide ($ZnS$—$SiO_2$) are continuously provided on the substrate by RF sputtering. This optical disk was mounted on the same optical information recording apparatus as in Example 1 to reproduce signals from the prepit. In this case, switching of reproduction signals from the prepit was performed in the same manner as in Example 3. As a result, good reproduced signals could be obtained from the prepit.

EXAMPLE 7

The optical disk having a phase-change type recording layer (phase-change type optical disk) used in Example 5 was provided, and, in the reproduction of signals from the prepit, the output levels of both the photodetectors of the half-split photodetector 23 were compared with each other. As a result, it was found that, when the signal from the land area in the tracking groove was reproduced, the signal output from the outer photodetector was on a higher output level, while, when the signal from the groove area in the tracking groove was reproduced, the signal output from the inner photodetector was on a higher output level. This demonstrates that comparison of the output levels of the two photodetectors of the half-split photodetector 23 makes it possible to judge whether the area tracked by the optical head 12 is the land area or the groove area of the tracking groove.

As described above, according to the present invention, a tracking groove comprising a land area and a groove areas is previously provided on a substrate of an optical disk, and an irregular prepit is previously provided on a boundary line between the land area and the groove area of the tracking groove. When information is recorded on both the land and groove areas, a half-split photodetector split into two parts by a splitting line perpendicular to the radial direction of the optical disk is used as a photoreceiver for receiving light reflected from the optical disk. The photoreceivers are switched so that light reflected from the prepit is reproduced as a signal in any one of the two photodetectors. This enables reproduction signals derived from light reflected from the prepit to be reproduced at a good S/N ratio, thus realizing an optical information recording apparatus which has a simple construction and enables information to be recorded on both the land and groove areas. Further, when the laser beam reflected from the prepit is input into both the photoreceptors of the half-split photodetector to compare the output level thereof, it makes it possible to judge whether the area tracked by the optical head is the land area or the groove area of the tracking groove.

The invention has been described in detail with particular reference to preferred embodiments, but it will be understood that variations and modifications can be effected within the scope of the present invention as set forth in the appended claims.

What is claimed is:

1. A combination of an optical information recording apparatus and an optical recording medium:

the recording medium comprising a tracking groove with a land area and a groove area for storing information, and a prepit region for storing an address that separates sectors of the tracking groove and that is aligned along an extension of an edge of the groove area; and the recording apparatus comprising a laser beam source, a half-split photodetector that is split along a line that is parallel to the tracking groove and that receives a laser beam from said laser beam source that has been reflected by the recording medium, a first signal amplifier connected to a first side of said photodetector, a second amplifier connected to a second side of said photodetector, and a signal switcher that receives signals from both said first and second signal amplifiers and provides a single output that is selected from one of said first and second signal amplifiers so that only one of the first and second sides of said photodetector is read at a time, said photodetector being aligned with the recording medium so that when the first side of said photodetector reads the groove or land area in a sector of the tracking groove the second side of said photodetector has read the address in the corresponding prepit region and when the first side of said photodetector reads the address in the prepit region for a sector the second side of said photodetector reads the corresponding land or groove area.

2. A method of reading an optical recording medium with an optical information recording apparatus, the recording medium having a tracking groove with a land area and a groove area for storing information, and a prepit region for storing an address that separates sectors of the tracking groove and that is aligned along an extension of an edge of the groove area, the recording apparatus having a laser beam source, a half-split photodetector that is split along a line that is parallel to the tracking groove and that receives a laser beam reflected by the recording medium, the method comprising the steps of:

connecting a first signal amplifier to a first side of the photodetector;

connecting a second amplifier to a second side of the photodetector;

connecting a signal switcher to both the first and second signal amplifiers and providing a single output from the signal switcher that is selected from one of the first and second signal amplifiers so that only one of the first and second sides of said photodetector is read at a time; and aligning the photodetector with the recording medium so that the first side of the photodetector reads the groove or land area in a sector of the tracking groove after the second side of the photodetector has read the address in the corresponding prepit region and so that the first side of the photodetector reads the address in the prepit region for a sector before the second side of the photodetector reads the corresponding land or groove area.

* * * * *